(12) United States Patent
Liebhold et al.

(10) Patent No.: US 7,092,614 B2
(45) Date of Patent: Aug. 15, 2006

(54) METHOD AND APPARATUS FOR CONTROLLING DIGITAL RECORDING AND ASSOCIATED USER INTERFACES

(75) Inventors: Valerie Sacrez Liebhold, Carmel, IN (US); Steven Anthony Barron, Singapore (SG); Richard Earl Jones, Plainfield, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 113 days.

(21) Appl. No.: 10/512,777

(22) PCT Filed: Apr. 14, 2003

(86) PCT No.: PCT/US03/11401

§ 371 (c)(1), (2), (4) Date: Oct. 27, 2004

(87) PCT Pub. No.: WO03/011401

PCT Pub. Date: Nov. 13, 2003

(65) Prior Publication Data
US 2005/0163466 A1 Jul. 28, 2005

(51) Int. Cl.
*H04N 7/00* (2006.01)
*H04N 5/91* (2006.01)

(52) U.S. Cl. .......................... 386/46; 386/83
(58) Field of Classification Search .................. 386/46, 386/83, 125, 124, 45, 1, 52; H04N 5/91, H04N 7/00
See application file for complete search history.

(56) References Cited

U.S. PATENT DOCUMENTS

2003/0095792 A1* 5/2003 Ogikubo ....................... 386/83
2004/0181811 A1* 9/2004 Rakib ........................ 725/122

FOREIGN PATENT DOCUMENTS

EP 0911825 4/1999
EP 1050880 11/2000

OTHER PUBLICATIONS

Search Report Dated Jul. 22, 2003.

* cited by examiner

*Primary Examiner*—Robert Chevalier
(74) *Attorney, Agent, or Firm*—Joseph J. Laks; Robert D. Shedd; Reitseng Lin

(57) ABSTRACT

A method for controlling recording in a digital recording apparatus enables users to create improved video recordings and also conserves memory space of the recording apparatus. According to an exemplary embodiment, the method includes steps of detecting a first user input during recording representing a command to stop recording, enabling display of a first predetermined message responsive to the first user input, receiving a second user input representing a response to the first predetermined message, and controlling the digital video recording apparatus to generate a single program recording and a single program listing for the single program recording in response to the second user input.

24 Claims, 4 Drawing Sheets

METHOD AND APPARATUS FOR CONTROLLING DIGITAL RECORDING AND ASSOCIATED USER INTERFACES

This application claims the benefit, under 35 U.S.C. § 365 of International Application PCT/US03/111401, filed Apr. 14, 2003, which was published in accordance with PCT Article 21(2) on Nov. 13, 2003 in English and which claims the benefit of Singapore Patent Application No. 200202562.5, filed Apr. 29, 2002.

BACKGROUND OF THE INVENTION

1. Field of the Invention

The present invention generally relates to a method and apparatus for performing digital recordings, and more particularly, to a digital recording apparatus and a method for controlling a digital recording apparatus that enables users to create improved video recordings and also conserves memory space of the apparatus.

2. Background Information

Personal video recorders (PVRs) are digital recording apparatuses that provide various features such as allowing a user to select for recording, by means of a graphical user interface (GUI) displayed on an associated television set, monitor, or other display device, a television program to be broadcast at a future time or which is currently being broadcast. Such apparatuses digitally record the selected program onto a storage module, such as a hard disk, and upon user command playback the stored program by retrieving it from storage, decompressing or decoding the program and outputting the video signal to an associated television set, monitor, or other display device. Apparatuses having such capabilities are currently sold under trade names such as "TiVo," "RePlayTV," "Sky+," and "Showstopper."

Such devices offer features and advantages in controlling the recording and playback of programs that were previously not available to the consumer via analog recording devices. The features include the ability to pause a live program on the screen while continuing to record the program onto a storage device such that the user can continue playback of the program at their convenience without missing any portion of the currently broadcast program, and also simultaneously recording and playing back, either the same program or different programs, thereby providing great flexibility in recording and playing back the received video signals. Since the programs are digitally stored and processed, the devices also allow the user to have greater control of the playback, for example, instantly skipping ahead by the predetermined amount of time. Such devices also generally are designed to work with a program guide that allows the user to easily see, in a grid format, program schedules, and to select a particular program for recording. The devices may also include input terminals for connecting playback devices, such as a camcorder, to the PVR to digitally record the contents of the devices onto the PVR for later playback.

However, with current digital recording apparatuses, if a user presses a "STOP" key during a recording operation, the recording operation is stopped and the recorded video content is stored as a single recording. Thereafter, if the user presses a "RECORD" key to resume recording, a new recording will be created, but it will be considered unrelated to the previous recording. That is, the new recording will be created as an independent recording that is separate and distinct from the previous recording (e.g., having a different name or title). For example, if the user stops the recording during the middle of a selected program that is chosen from a program guide, and then restarts the recording at some later time in the program, for example after a commercial break, the recordings may be listed by the PVR as two separate programs, even though they are of the same program. This may also be problematic in cases where the user wants to create a single recording based on a recording stored on a separate device, for example a camcorder, by editing out unwanted portions of the recording. Therefore, this functionality may be disadvantageous since it prevents users from creating a single continuous recording.

Also with current digital recording apparatuses, if a user presses a "PAUSE" key during a recording operation, the recording continues and a time-shifting function is performed during playback. That is, during playback the recording apparatus shifts in time over the video content that occurs after depression of the "PAUSE" key, but it still records this video content. Accordingly, this functionality may also be disadvantageous since it fails to remove the unwanted portions of the programs and fails to conserve memory space. In particular, the user must perform an editing process after the entire recording has been saved to memory in order to eliminate any unwanted video content. As a result, the recording apparatus must utilize valuable memory space until any unwanted video content is erased through editing.

Accordingly, there is a need for a method for controlling a digital recording apparatus that avoids the aforementioned problems, and thereby enables users to create improved video recordings and also conserves memory space of the recording apparatus.

SUMMARY OF THE INVENTION

In accordance with an aspect of the present invention, a method for controlling recording in a digital video recording apparatus is disclosed. According to an exemplary embodiment, the method comprises steps of detecting a first user input during recording representing a command to stop recording, enabling display of a first predetermined message responsive to the first user input, receiving a second user input representing a response to the first predetermined message, and controlling the digital video recording apparatus responsive to the second user input.

In accordance with another aspect of the present invention, a digital recording apparatus is disclosed. According to an exemplary embodiment, the apparatus comprises memory means for storing digital video data during recording. Processing means detects a first user input during recording, wherein the first user input represents a command to stop recording. Image generating means enables display of a first predetermined message responsive to the first user input. Processing means also receives a second user input representing a response to the first predetermined message, and controls the digital video recording apparatus responsive to the second user input.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
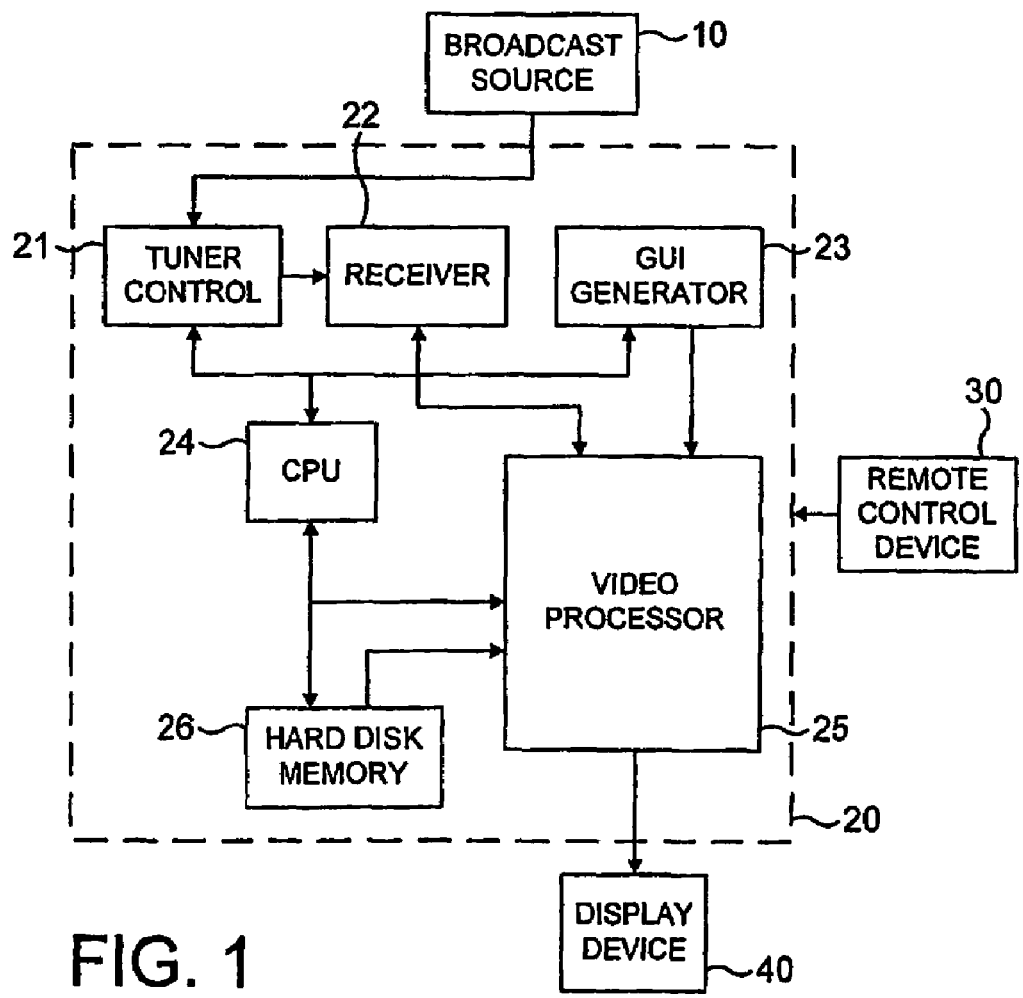
FIG. 1 illustrates an exemplary digital recording apparatus for implementing the present invention.

Referring now to the drawings, and more particularly to FIG. 1, an environment 100 suitable for implementing the present invention is shown. As shown in FIG. 1, environment 100 comprises a digital recording device 20, which includes various elements for receiving and processing program signals and generating audio and video signals suitable for display. Digital recording device 20 is coupled to a broadcast source 10 for receiving program signals, a remote control device 30 for receiving user input signals, and a display device 40 for providing a program display. Display device 40 may be included with the elements of digital recording device 20 as an integrated package. Also shown in FIG. 1, digital recording apparatus 20 comprises a tuner control block 21, a receiver 22, a GUI generator 23, a central processing unit (CPU) 24, a video processor 25, and a hard disk memory 26. As will be intuitive to those skilled in the art, many of the foregoing elements of apparatus 20 may be embodied using integrated circuits (ICs).

In FIG. 1, broadcast source 10 is operative to provide data including video signals to digital recording apparatus 20 for recording. Broadcast source 10 may for example provide data to apparatus 10 via a terrestrial, satellite, cable, Internet, or other type of wired or wireless communication link. Broadcast source 10 may also represent a live or recorded broadcast source provided through a device connected to digital recording apparatus 20 such as one provided from a camcorder, DVD player or other similar device.

Digital recording apparatus 20 is operative to digitally record data provided from broadcast source 10, and may be embodied as a PVR or other digital video recording device, such as a digital versatile disk (DVD) recording device. According to an exemplary embodiment, tuner control block 21 is operative to receive data from broadcast source 10 and perform a tuning function to generate tuned signals. Receiver 22 is operative to receive and process the tuned signals provided from tuner control block 21 to thereby generate corresponding IF and baseband signals. GUI generator 23 is operative to generate GUI displays (e.g., bitmap images) corresponding to different operating modes of apparatus 20. GUI displays are generated and displayed on display device 40 to, for example, provide status information regarding the operation of apparatus 20, or menus for allowing the user to make various selections to control the operation of apparatus 20. As will be discussed later herein, a user may provide inputs to apparatus 20 responsive to such GUI displays to control the operation of apparatus 20.

CPU 24 is operative to perform the overall control of the various components of apparatus 20. According to an exemplary embodiment, CPU 24 generates various control signals, which control the operation of the other elements of apparatus 20 to provide the known digital recording features, such as pausing a portion of the received video on the display device 40 while continuing to record the incoming video on hard drive memory 26 for future playback. Video processor 25 is operative to perform various video processing functions of apparatus 20, such as decompressing, decoding, encoding, etc, to generate video signals suitable for display on device 40. According to an exemplary embodiment, video processor 25 processes and formats video signals provided from receiver 22, as well as video data retrieved from hard disk memory 26 to enable corresponding visual displays on display device 40, for example in the NTSC or PAL format. Video processor 25 may also combine such video images with GUI displays generated by GUI generator 23. The combination may be implemented with a switching device (not shown) that switches between the video signal and the GUI signal to overlay the GUI display onto the program display. Hard disk memory 26 is operative to store digital video data under the control of CPU 24. A table or listing of programs stored on the hard disk may be stored on the hard disk under the control of CPU 24. The programs and the listing of programs may be stored on the hard disk using conventionally known methods, including using contiguous or non-contiguous blocks of data that are identified using a file allocation table. The listing may also be stored on a memory device separate from the hard disk. Although memory 26 is shown in FIG. 1 as a hard disk memory for purposes of example, it may also be embodied in another form that is capable of storing large amounts of digital video data, such as one or more optical disks, flash memory, removable hard disk, solid state memory or the like.

Remote control device 30 is operative to provide user control inputs to digital recording apparatus 20, and may for example be embodied as a hand-held remote control, keyboard, or other input device such as an input terminal integral with apparatus 20. Remote control device 30 may be coupled to a receiver (not shown) contained in recording apparatus 20 via a wired or wireless medium, for example RF or IR signaling. According to an exemplary embodiment, a user may use remote control device 30 to transmit commands to control the various operating modes of apparatus 20, such as to select a television program to be recorded from an electronic program guide ("EPG") displayed on display device 40, and to respond to a screen message displayed on display device 40. Although not expressly indicated in FIG. 1, CPU 24 is operative to receive and process user inputs provided to apparatus 20 via remote control device 30. Display device 40 is operative to visually display images responsive to the video output signals provided from video processor 25, and may for example be embodied as a television screen, monitor, or other display device.

Figure 2:
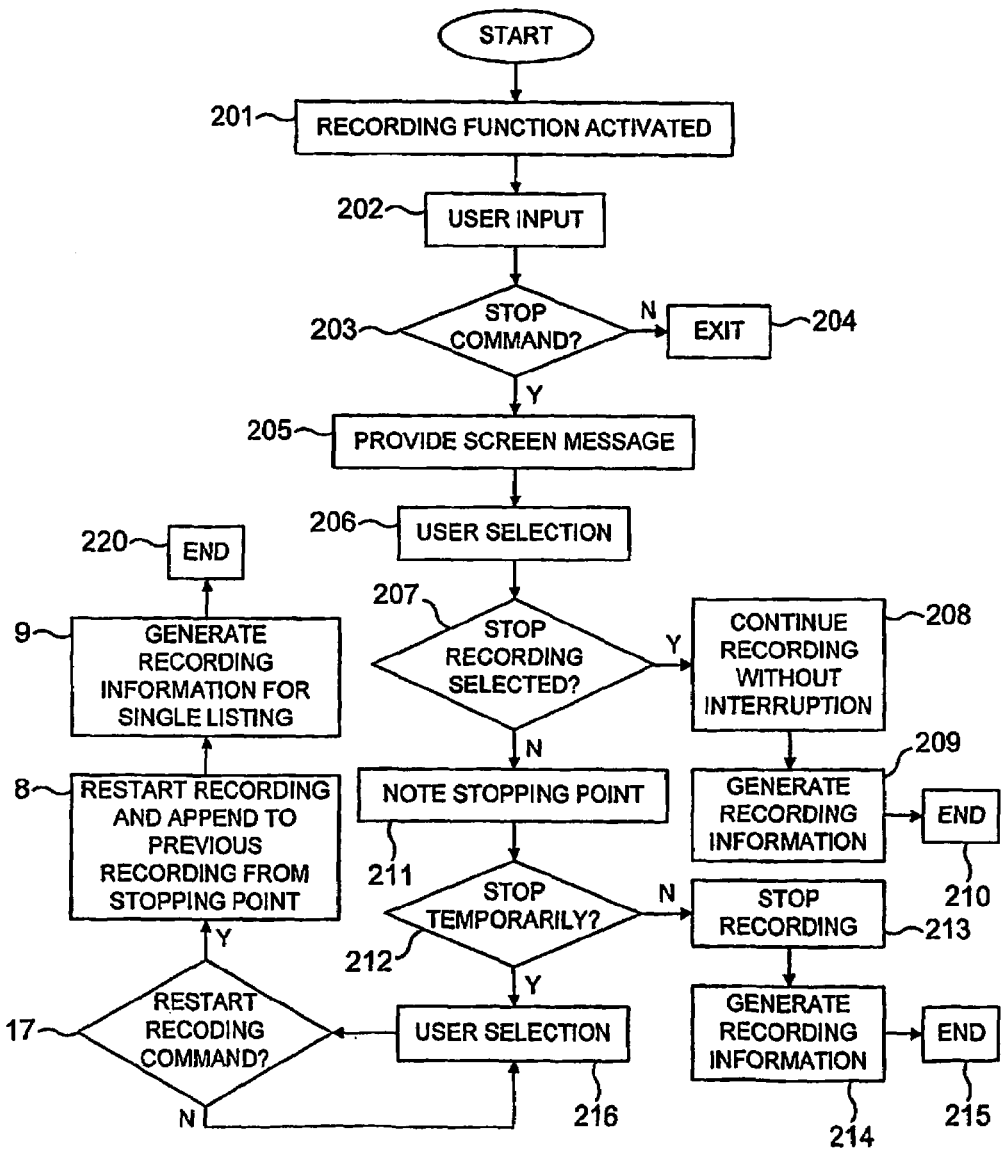
FIG. 2 is a flowchart illustrating exemplary steps for implementing the method according to the present invention.

Turning now to FIG. 2, a flowchart 200 illustrating exemplary steps for implementing a method according to the present invention is shown. For purposes of example and explanation, the steps of FIG. 2 will be described with reference to digital recording apparatus 20 of FIG. 1. Accordingly, the steps of FIG. 2 are merely exemplary, and are not intended to limit the present invention in any manner.

At step 201, a recording function of apparatus 20 is activated. According to an exemplary embodiment, the recording function is activated In response to a user input to apparatus 20 via remote control device 30. This user input may for example be provided via an EPG displayed on display device 40. CPU 24 detects the user input and activates the recording function by generating a control signal, which enables incoming video signals to be processed, for example, by encoding in an MPEG-2 format, and stored in hard disk memory 26. The incoming video signals may also be displayed at the same time they are being stored on hard disk memory 26.

At step 202, a user input to apparatus 20 is detected while the recording function of apparatus 20 is activated. Next, at step 203, a determination is made as to whether the user input at step 202 represents a command to STOP the recording function. According to an exemplary embodiment, CPU 24 is programmed to detect the actuation of a "STOP" key on remote control device 30 by a user while the recording function is occurring and perform the steps described below. Accordingly, at step 203, CPU 24 determines whether the "STOP" key of remote control device 30 was pressed at step 202.

If the determination at step 203 is negative, process flow advances to step 204 where the algorithm is exited. Alternatively, if the determination at step 203 is positive, process flow advances to step 205 where the user is provided with a predetermined screen message via display device 40. According to an exemplary embodiment, CPU 24 outputs a control signal, which causes GUI generator 23 to generate the predetermined screen message and output the same to video processor 25 for ultimate display via display device 40. An example of the predetermined screen message provided at step 205 is shown in FIG. 3.

Figure 3:
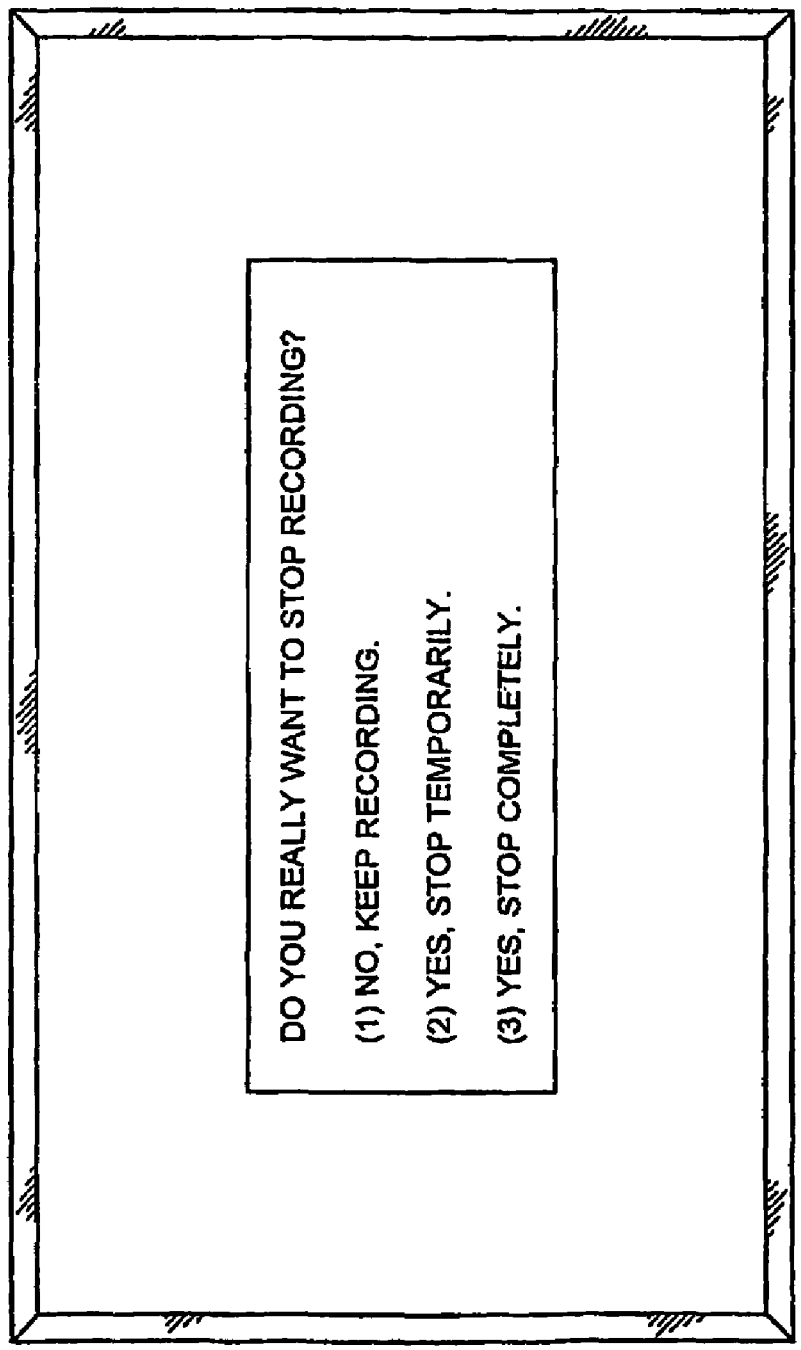
FIG. 3 is an exemplary screen message for implementing the method according to the present invention.

As indicated in FIG. 3, exemplary screen message 300 provides the user with various options regarding how apparatus 20 should proceed in response to the command to STOP the recording function (i.e. depression of the "STOP" key). According to an exemplary embodiment, the user is provided with three different such options, as represented by exemplary screen message 300. As indicated in FIG. 3, option (1) allows the user to cancel the STOP command and continue with the recording function, option (2) allows the user to temporarily STOP the recording function, and option (3) allows the user to completely STOP the recording function. Further details regarding each of these options are provided below.

After the predetermined screen message 300 is displayed at step 205, process flow advances to step 206 where the user may select from among the options presented in the screen message. According to an exemplary embodiment, the user makes this selection at step 206 via an input to remote control device 30. For example, the user may press directional arrow keys on remote control device 30 to selectively move a highlighted cursor over a desired option from the screen message, and then press an "ENTER" key in order to select the highlighted option, or by pressing a number key that corresponds to the desired option. Other selection techniques, known to those skilled in the art, such the use of a touch screen, may also be used at step 206.

At step 207, it is determined whether the user has selected to STOP the recording. If it is determined that the user does not wish to STOP recording, as determined by user selection of option 1 of message 300, apparatus 20 continues recording and stores the recording on the hard disk 26 without interruption. The recording without interruption is possible since apparatus 20 continues recording the program to the hard disk even though the STOP command has been received, until the STOP command has been confirmed through message 300. At the end of the recording, apparatus 20 generates a single listing and listing information for the recorded program in step 209. Apparatus 20 may provide a listing of the programs stored on the hard disk memory 26 in a listing screen in response to user input.

If the user wishes to stop the recording, it is determined whether the user wishes to stop the recording on a temporary basis or permanently in step 212 in view of the selection from message 300. If the user wishes to stop the recording permanently, as indicated by the selection of option 2 in message 300, apparatus 20 stops recording in step 213. Apparatus 20 then generates program listing information for the recorded program in step 214. Apparatus 20 provides a listing of the stored programs in a listing screen in response to user input.

Figure 4:
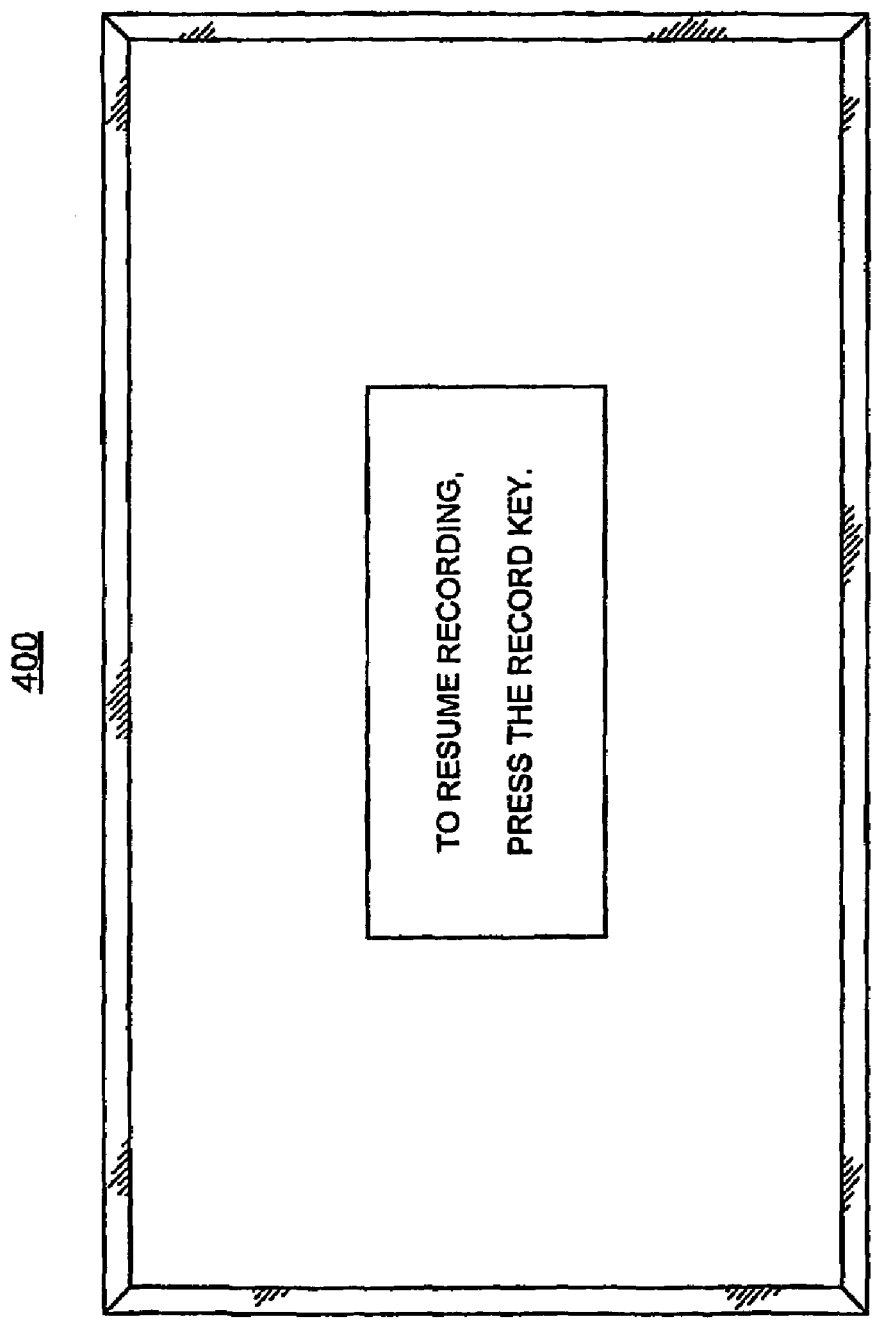
FIG. 4 is another exemplary screen message for Implementing the method according to the present invention.

If the user wishes to stop the recording on a temporary basis as determined in step 212, by the selection of option 3 of message 300, apparatus stops recording the program and awaits further inputs from the user in step 216. Apparatus 20 may provide a message, such as that shown in FIG. 4, to remind the user to press a designated key, such as "RECORD" to restart the recording function. Message 400 may be shown on a portion of the screen or as a transparent overlay on the video to allow the user to continue to view the Incoming programming and be reminded to restart the recording at the desired point.

If the Input from the user is to restart the recording, as determined by step 217, apparatus begins recording the received program signals and appends the recorded program signals to the previously recorded program signals at the point at which the recording was previously stopped, in step 218. Therefore, the program continues to be recorded as a single program even though the STOP command had previously been received. The recording continues until the end of the program, or until the user specifies that the recording is to be completely stopped. When the recording is complete, apparatus 20 generates program listing information which is displayed in the listing screen in response to user input. The steps of stopping the recording, determining whether the user wishes to completely stop the recording or temporarily stop the recording, and generating a single recording as required is repeated each time the STOP recording command is received. As long as the user does not specify that the recording is to completely stopped, the recording is stored as a single program, and listed as such on the listing screen. Therefore, it can be seen that the user can conveniently record a program and delete unwanted portion of the program as the program is being received and recorded. It can be seen that this feature is useful in recording systems that utilize a program guide, wherein the user selects a program to be recorded using the program guide, but may not necessary provide the ability to delete portions of the selected program.

As described herein, the present invention provides a digital recording apparatus that advantageously enables users to create improved video recordings and also conserves memory space of the recording apparatus. The invention may be implemented in software from using programming languages known to those skilled in the art. The steps for implementing the method can be programming into CPU 24 and the associated elements of apparatus 20. The various messages and on screen displays for prompting the necessary user response may be stored and/or generated by GUI generate 23.

While this invention has been described as having a preferred design, the present invention can be further modified within the spirit and scope of this disclosure. This application is therefore intended to cover any variations, uses, or adaptations of the invention using its general principles. For example, it is clear that the principles of this invention is applicable to recording devices that utilize different recording media, such as CD and DVD discs. Also, the signal source may comprise multiple signal sources that can be selected by the user, for example, an RF signal, a satellite signal, a signal from a device such as a camcorder, or a combination of sources. As such, a single recording may be generated from signals from a plurality of sources, for example, a first portion of the program may be received from a satellite signal while the second portion of the recorded program may be received from a camcorder connected to the apparatus. Further, this application is intended to cover such departures from the present disclosure as come within known or customary practice in the art to which this invention pertains and which fall within the limits of the appended claims.

The invention claimed is:

1. A method for controlling a recording operation in a digital video recording apparatus, comprising the steps of:
   detecting a first user input during the recording operation, the first user input representing a command to stop the recording operation;
   enabling display of a first predetermined message responsive to the first user input;
   receiving a second user input representing a response to the first predetermined message; and
   controlling the recording operation to generate a signal program recording in response to the second user input, and generating a single program listing for the single program recording.

2. The method of claim 1, wherein the second user input represents a command to continue recording.

3. The method of claim 1, wherein the second user input represents a command confirming the first user input to stop recording.

4. The method of claim 1, wherein the second user input represents a command to temporarily stop recording.

5. The method of claim 4, further comprising the step of enabling display of a second predetermined message responsive to the command to temporarily stop recording.

6. The method of claim 5, further comprising the step of receiving a third user input responsive to the second predetermined message, wherein the third user input represents a command to continue recording.

7. The method of claim 6, wherein video content recorded prior to the first user input and video content recorded after the third user input are formed as a single recording.

8. The method of claim 6, wherein the recording operation is not performed during an interval between the receipt of the second user input and the receipt of the third user input.

9. A digital video recording apparatus, comprising:
   memory means for storing digital video data during a recording operation;
   processing means for detecting a first user input during the recording operation, the first user input representing a command to stop the recording operation;
   GUI generating means for enabling display of a first predetermined message responsive to the first user input; and
   wherein the processing means further receives a second user input representing a response to the first predetermined message, and controls the recording operation to generate a single program recording and to generate a single program listing for the single program recording in response to the second user input.

10. The digital video recording apparatus of claim 9, wherein the second user input represents a command to continue recording.

11. The digital video recording apparatus of claim 9, wherein the second user input represents a command confirming the first user input to completely stop recording.

12. The digital video recording apparatus of claim 9, wherein the second user input represents a command to temporarily stop recording.

13. The digital video recording apparatus of claim 12, wherein the GUI generating means further enables display of a second predetermined message responsive to the second user input.

14. The digital video recording apparatus of claim 13, wherein the processing means further receives a third user input responsive to the second predetermined message, wherein the third user input represents a command to continue recording.

15. The digital video recording apparatus of claim 14, wherein the processing means further causes video content recorded prior to the first user input and video content recorded after the third user input to be formed as a single recording.

16. The digital video recording apparatus of claim 14, wherein the memory means does not store digital video data during an interval between the receipt of the second user input and the receipt of the third user input.

17. A digital video recording apparatus, comprising:
   a memory operative to store digital video data during a recording operation;
   a processor operative to detect a first user input during the recording operation, the first user input representing a command to stop the recording operation;
   a GUI generator operative to enable display of a first predetermined message responsive to the first user input; and
   wherein the processor is further operative to receive a second user input representing a response to the first predetermined message, and control the recording operation to generate a single program recording and a single program listing for the single program in response to the second user input.

18. The digital video recording apparatus of claim 17, wherein the second user input represents a command to continue recording.

19. The digital video recording apparatus of claim 17, wherein the second user input represents a command confirming the first user input to stop recording.

20. The digital video recording apparatus of claim 17, wherein the second user input represents a command to temporarily stop recording.

21. The digital video recording apparatus of claim 20, wherein the GUI generator is further operative to enable display of a second predetermined message responsive to the second user input.

22. The digital video recording apparatus of claim 21, wherein the processor is further operative to receive a third user input responsive to the second predetermined message, wherein the third user input represents a command to continue recording.

23. The digital video recording apparatus of claim 22, wherein the processor is further operative to cause video content recorded prior to the first user input and video content recorded after the third user input to be formed as a single recording.

24. The digital video recording apparatus of claim 22, wherein the memory is operative to not store digital video data during an interval between the receipt of the second user input and the receipt of the third user input.

* * * * *